Patented Sept. 29, 1942

2,296,856

UNITED STATES PATENT OFFICE 2,296,856

MANUFACTURE OF CELLULOSE DERIVATIVES AND OF ARTIFICIAL FILAMENTS, FILMS, AND OTHER SHAPED ARTICLES THEREFROM

Leon Lilienfeld, Vienna, Austria; Antonie Lilienfeld, administratrix of said Leon Lilienfeld, deceased, assignor to Lilienfeld Patents Inc., Boston, Mass., a corporation of Massachusetts No Drawing. Application March 27, 1936, Serial No. 71,263. In Great Britain March 29, 1935

12 Claims. (Cl. 18—54)

In my U. S. Patents Nos. 1,858,097, 2,021,861, 1,910,440 and in my British Patents 357,167, 357,527, 368,288, 367,920 and 390,519, I have described processes for making xanthates of various cellulose derivatives in which at least one hydroxyl hydrogen atom of the cellulose molecule $n(C_6H_{10}O_5)$ is replaced by an organic radical, particularly an alcohol radical, and in which at least one hydroxyl group is unblocked and capable of chaining to itself a CSS-group, which processes comprise treating these cellulose derivatives in presence of alkali with carbon bisulphide.

In some of the examples of these prior patents and in U. S. Patents 2,100,010 and 2,163,609, I have disclosed the employment of 600 to 1000 parts of carbon bisulphide for treating the etherified products produced from each 1000 parts of the parent air-dry cellulose.

Now, I have made the discovery that it is possible, by using properly etherified cellulose derivatives, (e. g. those shown in my said prior patents, and those shown in the examples of the present case), with proportions of carbon bisulphide which are smaller than 20 parts of carbon bisulphide per 100 parts of the parent cellulose derivative, to produce xanthates of the aforementioned cellulose derivatives which are flawlessly convertible into useful shaped structures.

Applicant is aware that a theoretical article was published by Berl & Bitter, in "Cellulosechemia," volume 7, 1926, of which pages 139 and 140 discuss the possibility of xanthating low-alkyl ethers of cellulose containing one methyl group or one ethyl group, per one $C_6H_{10}O_5$-molecular unit of cellulose. The article discusses also efforts to xanthate cellulose ethers containing about 1.25 and 1.5 ethyl groups per one $C_6H_{10}O_5$-molecular unit of cellulose, and also more highly etherified alkyl ethers of cellulose containing 1.8 or 2 or 2.25 or 2.5 alkyl groups per one $C_6H_{10}O_5$-molecular unit of cellulose. In this article 35% of carbon bisulphide (based on the cellulose) was used, (equivalent to about 32.25% $CS_2$ based on the mono-methyl ether of cellulose).

But while it was readily possible to xanthate the alkyl ether containing one alkyl group per one $C_6H_{10}O_5$-molecular unit of cellulose, the article has no discussion relative to the production of regenerated structures (e. g. threads) from the xanthates produced. The xanthates produced according to the examples given in said article, are in fact of no utility for the production of artificial threads, films and the like.

The discovery forming the basis of the present case is the more surprising, since it is well known that viscoses made from cellulose xanthates which are prepared by means of small proportions of carbon bisulphide contain appreciable amounts of undissolved constituents which render the filtration difficult and which, in addition, owing to their slimy character, are liable to slip through the filtering material and thus, make the viscose unsuitable or inferior for producing shaped structures, such as film, artificial threads and the like therefrom.

Furthermore, viscoses produced by means of smaller quantities of carbon bisulphide than 25 parts or 20 parts per 100 parts of cellulose have a considerably higher viscosity than viscoses prepared from an alkali cellulose of same degree of ripeness by means of amounts of carbon bisulphide exceeding 20 or 25 parts per 100 parts of cellulose.

It is further surprising that, according to the present invention, it is possible, by using in the xanthation amounts of carbon bisulphide which are smaller than 10 parts, for example 5 to 8 parts of carbon bisulphide per 100 parts of the parent cellulose derivative, to produce highly useful xanthates of the cellulose derivatives which have excellent properties and which can be worked up into shaped structures possessing remarkable properties.

The solutions of the xanthates produced according to the present invention are less colored than ordinary viscose, they are easily filterable and, when filtered, they have no pronounced tendency towards clogging the spinning nozzles.

A further technical advance of the present invention is marked by the fact that, in spite of the small amounts of carbon bisulphide used for their production, many cellulose derivative xanthates produced according to the invention are capable of being worked up into shaped structures, such as threads, film or the like having dynamometric properties which are not inferior or not substantially inferior to the dynamometric properties of such shaped structures as are prepared from xanthates of the same cellulose derivatives, but which are made with the usual amounts of carbon bisulphide of from 20 parts of carbon bisulphide per 100 parts of the parent cellulose derivative upwards, i. e. with amounts of carbon bisulphide underlying the processes described in my aforementioned specifications.

In addition, the present invention is attended by a considerable economical advance over the relative processes known hitherto.

Although many cellulose derivatives in which at least one hydroxyl hydrogen atom of the cellulose molecule $n(C_6H_{10}O_5)$ is replaced by an organic radical and in which at least one hydroxyl group is unblocked and capable of chaining to itself a CSS-group, are suitable parent materials for the present process, according to the present state of my knowledge, I prefer to use cellulose ethers of low degrees of etherification. On account of their offering the greatest variety of ways towards being converted into their xanthates, alkali-soluble cellulose ethers, for example such alkyl- or aralkyl- or hydroxy-alkyl- or hydroxy-acid derivatives of cellulose as will at least partially dissolve in caustic alkali solution at room temperature or below room temperature or can be dissolved therein by cooling their suspensions or incomplete solutions in caustic alkali solution to a temperature between plus 5° C. and minus 10° C. or lower and bringing them back to room temperature or to a temperature between 0° C. and room temperature play an especially prominent part of the present invention.

These alkali-soluble ethers and processes for making same are for the first time described in my U. S. Patents Nos. 1,589,606, 1,683,831, 1,683,682, 1,722,927, 1,722,928, 1,682,292, 1,682,294, 1,682,293 and in my British Patent 374,964, and the bringing into solution or complete solution of such members of these groups of cellulose ethers as do not dissolve or dissolve only incompletely in caustic alkali solution at room temperature is for the first time described in my British Patent No. 212,864 (see for instance page 3, lines 62 to 71).

As far as alkali-soluble cellulose ethers are used in the present invention as parent material, it is to be understood that in the present invention alkali-soluble cellulose ethers may be used which are made by any process or method, whatever, for instance according to any one of the processes and methods described in my U. S. Patents Nos. 1,589,606, 1,683,831, 1,683,682, 1,722,927, 1,722,928, 1,682,292, 1,682,293 and 1,682,294 and in my British Patents 462,456, 459,122, 459,123, 462,712 and 462,713, or according to any other process or method suitable for the preparation of such cellulose ethers as will completely or almost completely dissolve in caustic alkali solution at room temperature and/or at a lower temperature, for example at a temperature between room temperature and 0° C. or lower, or such cellulose ethers as will not dissolve or will only partially dissolve in caustic alkali solution at room temperature, but as can be dissolved, at least partially, therein by cooling their suspensions or incomplete solutions in caustic alkali solution to a temperature between room temperature and 0° C. or to 0° C. or to a temperature below 0° C., for example to minus 5° C. or to minus 10° C. or lower and then allowing the temperature to rise to 0° C. or above 0° C., for example to room temperature, or such cellulose ethers as will not dissolve in caustic alkali solution at room temperature or at a temperature between room temperature and 0° C. or even at 0° C., but as can be made to partially or completely dissolve therein at room temperature and/or at a temperature between room temperature and 0° C. or at 0° C. by cooling their suspensions or incomplete solutions to a temperature below 0° C. for example to minus 5° C. or minus 10° C. or lower and then allowing the temperature to rise to 0 C. or above 0° C., for example to room temperature.

In other words: In the present invention not only such alkali soluble cellulose ethers as can be prepared by the processes and methods described in the specifications set forth in the foregoing paragraph, but also such alkali-soluble cellulose ethers may be used as are prepared by any other process or method suitable for the preparation of cellulose ethers which are at least partially soluble in caustic alkali solution or can be dissolved therein by application of low temperatures, for example by the process described in my British Patent No. 212,864.

It is further to be understood that, in the present invention either simple or mixed cellulose ethers can be employed. As mixed ethers the following may be named by way of example:

MIXED ETHERS

Cellulose derivatives containing in their molecule two different alkyl groups, cellulose derivatives containing in their molecule two different hydroxy-alkyl groups, cellulose derivatives containing in their molecule an alkyl group and a hydroxy-alkyl group, cellulose derivatives containing in their molecule two different hydroxy-acid residues, cellulose derivatives containing in their molecule an alkyl group and a hydroxy-acid residue, cellulose derivatives containing in their molecule a hydroxy-alkyl group and a hydroxy-acid residue and so on.

The process may be carried out in various ways, the more important methods being described in the following lines by way of examples to which, however, the present invention is not limited. Since, in many cases, the combination of the preparation of the parent cellulose derivatives particularly ethers to be xanthated with the xanthating operation into a continuous operation or into a sequence of operations, presents some advantages, also some examples for the preparation of the starting cellulose derivatives particularly ethers are included in the following description of the practical carrying out of the present invention.

*First method*

A cellulose derivative in which at least one hydroxyl hydrogen atom of the cellulose molecule $n(C_6H_{10}O_5)$ is replaced by an organic radical, particularly by an unsubstituted or substituted alcohol radical, and in which at least one hydroxyl group is unblocked and capable of chaining to itself a CSS-group, is, according to the methods known for the production of alkali cellulose in the viscose art converted into its alkali compound of such cellulose derivative, and the alkali compound treated at room temperature or at a temperature exceeding room temperature, for example at 30 to 50° C., or at a temperature between room temperature and 0° C. or at 0° C. or at a temperature below 0° C., for example at minus 5 to minus 10° C. or lower, or partly at room temperature and partly at a temperature below room temperature, for example between room temperature and 0° C. or below 0° C., for example at minus 5° C. or minus 10° C. or lower, with less carbon bisulphide than 20, preferably less than 15 or less than 10 parts of carbon bisulphide per 100 parts of the cellulose derivative, and the thus obtained xanthate is dissolved in water or in a caustic alkali solution, the dissolving being conducted at room temperature or at a temperature between room temperature and 0° C. or at 0° C. or at a temperature below 0° C., for example at minus 5 to minus 10° C. or lower, or partly at room temperature and partly at a temperature below room temperature, for example between room temperature and 0° C. or below 0° C., for example at minus 5° C. or minus 10° C. or lower.

Second method

A cellulose derivative in which at least one hydroxyl hydrogen atom of the cellulose molecule $n(C_6H_{10}O_5)$ is replaced by an organic radical, particularly by an unsubstituted or substituted alcohol radical, and in which at least one hydroxyl group is unblocked and capable of chaining to itself a CSS-group, is suspended or dissolved in caustic alkali solution (according to its solubility relationships either at room temperature or at a temperature between room temperature and 0° C. or at 0° C. or at a temperature below 0° C., for example at minus 5 to minus 10° C. or lower, or partly at room temperature and partly at a temperature below room temperature, for example between room temperature and 0° C. or below 0° C., for example at minus 5° C. or minus 10° C. or lower), whereupon an amount of carbon bisulphide which is smaller than 20, preferably smaller than 15 or smaller than 10 parts per 100 parts of the cellulose derivative is incorporated with the thus obtained suspension or complete or incomplete solution and the mixture treated with the carbon bisulphide, preferably with stirring, shaking or otherwise agitating. The treatment with the carbon bisulphide may be conducted at room temperature or at a temperature between room temperature and 0° C. or at 0° C. or below 0° C., for example at minus 5° C. or minus 10° C. or lower, or partly at room temperature and partly at a temperature below room temperature, for example between room temperature and 0° C. or below 0° C., for example at minus 5° C. or minus 10° C. or lower.

Third method

Cellulose is acted upon in presence of an alkali, for example in the form of alkali cellulose with a reagent capable of replacing one or more hydroxyl hydrogen atoms of the cellulose molecule by an organic radical or radicals, particularly by an unsubstituted or substituted alcohol radical or radicals, whereupon the resultant reaction mass is washed and thereafter treated with caustic alkali in the form of caustic alkali solution or of solid caustic alkali or of a mixture of caustic alkali solution and solid caustic alkali and with less carbon bisulphide than 20, preferably less than 15 or less than 10 parts of carbon bisulphide per 100 parts of the cellulose derivative, the carbon bisulphide being added either simultaneously with the caustic alkali or after a shorter or longer period of time calculated from the contacting of the cellulose derivative with the caustic alkali. The treatment with the caustic alkali and/or carbon bisulphide and/or the dissolving of the xanthated cellulose derivative may be conducted at room temperature or at a temperature between room temperature and 0° C. or at 0° C. or at a temperature below 0° C., for example at minus 5° C. or minus 10° C. or lower, or above room temperature, for example at 30 to 50° C., or partly at room temperature and partly at a temperature below room temperature, for example between room temperature and 0° C. or below 0° C., for example at minus 5° C. or minus 10° C. or lower, or above room temperature, for example at 30 to 50° C.

Fourth method

Cellulose is acted upon in presence of an alkali, for example in the form of alkali cellulose, with a reagent capable of replacing one or more hydroxyl hydrogen atoms of the cellulose molecule by an organic radical or radicals, particularly by an unsubstituted or substituted alcohol radical or radicals, the resultant reaction mass, without being washed, exposed to the action of a further quantity of caustic alkali in the form of caustic alkali solution or of solid caustic alkali or of a mixture of caustic alkali solution and solid caustic alkali and finally contacted with less carbon bisulphide than 20, preferably less than 15 or 10 parts less than 10 parts of carbon bisulphide per 100 parts of the cellulose derivative. The treatment with the caustic alkali and/or carbon bisulphide and/or the dissolving of the cellulose derivative xanthate may be conducted at room temperature or at a temperature between room temperature and 0° C. or at 0° C. or at a temperature below 0° C., for example at minus 5° C. or minus 10° C. or lower, or above room temperature, for example at 30 to 50° C., or partly at room temperature and partly at a temperature below room temperature, for example between room temperature and 0° C. or below 0° C., for example at minus 5° C. or minus 10° C. or lower, or above room temperature, for example at 30 to 50° C.

Fifth method

Cellulose is acted upon in presence of an alkali, for example in the form of alkali cellulose, with a reagent capable of replacing one or more hydroxyl hydrogen atoms of the cellulose molecule by an organic radical or radicals, particularly by an unsubstituted or substituted alcohol radical or radicals and the resultant reaction mass, without being washed and without being supplied with a fresh amount of caustic alkali, treated with less carbon bisulphide than 20, preferably less than 15 or less than 10 parts per 100 parts of the cellulose derivative. The treatment with the carbon bisulphide and/or the dissolving of the cellulose derivative xanthate may be conducted at room temperature or at a temperature between room temperature and 0° C. or at 0° C. or at a temperature below 0° C., for example at minus 5° C. or minus 10° C. or lower, or above room temperature, for example at 30 to 50° C., or partly at room temperature and partly at a temperature below room temperature, for example between room temperature and 0° C. or below 0° C., for example at minue 5° C. or minus 10° C. or lower, or above room temperature, for example at 30 to 50° C.

Sixth method

A reagent capable of replacing one or more hydroxyl hydrogen atoms of the cellulose molecule by an organic radical or radicals, particularly by an unsubstituted or substituted alcohol radical or radicals, and less carbon bisulphide than 20, preferably less than 15 or less than 10 parts of carbon bisulphide per 100 parts of the cellulose derivative are added to alkali cellulose simultaneously or (in either order) consecutively at an interval, which, in the case of adding the carbon bisulphide before the etherifying agent, may be so short that complete conversion of the alkali cellulose into a xanthate does not occur. The thus obtained xanthate is then dissolved in water or in a caustic alkali solution, the dissolving being conducted at room temperature or at a temperature between room temperature and 0° C. or at 0° C. or at a temperature below 0° C., for example at minus 5 to minus 10° C. or lower, or partly at room temperature and partly at a temperature below rom temperature, for example between room temperature and 0° C. or below 0° C., for example at minus 5° C. or minus 10° C. or lower.

*Seventh method*

Cellulose is acted upon in presence of an alkali, for example in the form of alkali cellulose, with a reagent capable of replacing one or more hydroxyl hydrogen atoms of the cellulose molecule by an organic radical or radicals, particularly by an unsubstituted or substituted alcohol radical or radicals, whereupon the resultant mass is washed and (if desired after being dried) brought in contact with a caustic alkali solution of such strength that the quantity added to the washed product of the reaction together with the water, if any, contained therein will bring about such proportion of water, caustic alkali and organic substitution derivative particularly ether of cellulose as is desired in the final solution or paste. Thereafter, the solution or paste or suspension (the character and the appearance of the product at this stage depends on the nature, solubility in caustic alkali solution and proportion of the alkali-soluble organic substitution derivative of cellulose present) may or may not be cooled down to a temperature below rom temperature or to 0° C. or to a temperature below 0° C. whereupon it is acted upon with less carbon bisulphide than 20, preferably less than 15 or less than 10 parts per 100 parts of the cellulose derivative at room temperature or above room temperature, for example at 30 to 50° C., or at a temperature between room temperature and 0° C., or at 0° C. or at a temperature below 0° C., for example at minus 5° C. or minus 10° C. or lower, or partly at room temperature and partly at a temperature below room temperature, for example between room temperature and 0° C. or below 0° C., for example at minus 5° C. or minus 10° C. or lower.

*Eighth method*

Mode of procedure as in the seventh method, but with the difference that, before being contacted with the caustic alkali solution, the reaction mass is not washed. As a matter of course, in this case, the caustic alkali, if any, contained in the reaction mass, is to be taken into account when calculating the strength of the caustic alkali solution.

The foregoing methods are applicable to organic substitution derivatives of cellulose which are soluble or insoluble in caustic alkali solution, whilst the following method is only suitable for such organic substitution derivatives of cellulose as are soluble in caustic alkali solution.

*Ninth method*

Cellulose is acted upon in presence of an alkali, for example in the form of alkali cellulose, with a reagent capable of replacing one or more hydroxyl hydrogen atoms of the cellulose molecule by an organic radical or radicals, particularly an unsubstituted or substituted alcohol radical or radicals, and the product of the reaction is isolated from the reaction mixture by dissolving it, if desired after washing, in dilute caustic alkali solution (the dissolution being conducted at room temperature or between room temperature and 0° C. or at 0° C. or at a temperature below 0° C., or partly at room temperature and partly at a temperature below room temperature, for example between room temperature and 0° C. or below 0° C., for example at minus 5° C. or minus 10° C. or lower), if necessary freeing the thus obtained solution from undissolved particles by filtration, centrifuging, settling and decanting or the like and precipitating the dissolved organic substitution derivative of cellulose by means of an acid substance or by means of a salt or a dehydrating agent, such as alcohol or by means of any other suitable precipitating agent. The so isolated substitution derivative of cellulose is (if desired after being washed and, if desired, dried), thereafter re-dissolved in caustic alkali solution at room temperature or below room temperature or at 0° C. or below 0° C. and exposed to the action of less carbon bisulphide than 20, preferably less than 15 or less than 10 parts of carbon bisulphide per 100 parts of the cellulose derivative at room temperature or above room temperature, for example at 30 to 50° C., or at a temperature between room temperature and 0° C. or at 0° C. or at a temperature below 0° C., for example at minus 5° C. or minus 10° C. or lower, or partly at room temperature and partly at a temperature below room temperature, for example between room temperature and 0° C. or below 0° C., for example at minus 5° C. or minus 10° C. or lower.

Since the foregoing description is far from exhausting all possible methods for carrying out the invention in practice, it is desired to state expressly that it is not intended to limit the invention to the foregoing methods of carrying it out, and, in addition, that the alkali-soluble or alkali-insoluble substitution derivatives, particularly ethers or ether-like compounds of cellulose may be prepared according to any process available for this purpose, i. e. according to the methods and processes described herein or according to the processes described in the specifications set forth in the first and eleventh paragraph of the present specification or according to any other process or method.

After the treatment with carbon bisulphide the final products may be purified or isolated from the reaction masses, for example by, optionally after neutralising them with a weak acid, for example acetic acid, precipitating them with an alcohol, such as methyl- or ethyl-alcohol, or with a solution of a salt, such as sodium chloride or an ammonium salt or the like or with carbon-dioxide or with sulphurous acid or with sodium bisulphite. The xanthate may be also purified by dialysis.

In many cases, however, purification or isolation is unnecessary, since the crude reaction masses are readily soluble in caustic alkali solution and yield solutions that contain little or no undissolved particles.

In spite of the fact that the xanthates of the present invention are produced by means of small proportions of carbon bisulphide, they are readily soluble in caustic alkali and water. On being acidified, they yield coagulates or precipitates which are insoluble in water. With salts of heavy metals, for instance zinc or copper, they yield salts of such metals.

It is further remarkable, that, in contrast to cellulose itself, the xanthate reaction takes place easily in presence of dilute alkali solutions.

The conversion of the xanthated cellulose derivatives prepared according to the present invention into shaped structures, for example threads, film, coatings of any kind or the like.

is effected, for example, by bringing a solution of a cellulose derivative made in accordance with the invention, into the desired shape and acting upon the thus shaped solution with a coagulating agent, for example one of the coagulating baths known in the viscose art.

The xanthated cellulose derivatives produced according to the present invention may be worked up into shaped structures also in such a manner that their shaped solutions are contacted with an agent or agents which has or have a coagulating effect on the shaped solution and a plasticizing effect on the freshly coagulated material. As coagulating and plasticising agents, baths containing at least 25 per cent. of sulphuric acid monohydrate (for example 25 to about 70 per cent. of sulphuric acid monohydrate), or such a proportion of another strong mineral acid as will produce an effect in the manufacture of shaped structures similar to that given by sulphuric acid containing at least 25 per cent. of sulphuric acid, have proved suitable. The coagulating and plasticising of the shaped solution may also occur in two steps by acting upon the shaped solution first with one or more agents which have a coagulating effect on the shaped solution and then with one or more agents (for example strong mineral acids, particularly strong sulphuric acid) which have a plasticising effect on the freshly coagulated material.

As far as supportless artificial structures, such as artificial threads, artificial hair, artificial straw, film, bands, strips or the like are concerned, the shaping and coagulating may be effected by extruding the cellulose derivative xanthate solutions through suitably formed openings into a coagulating bath. In case of such shaped structures as are combined with a rigid or pliable support, such as coatings, layers and impregnations of any kind, dressing of fabrics, textile printing, book cloth, tracing cloth, sizing of yarn, paper-sizing, paper-like surfacing etc. the shaping and coagulating may be accomplished by wholly or partially coating, impregnating, printing or otherwise covering or imbueing with the cellulose derivative xanthate solution a rigid or pliable support, and, with or without intermediate drying, treating the material with a coagulating bath, by either introducing the material into a coagulating bath or conducting the material through a mist of the coagulating bath or by any other method of applying a liquid to a rigid or pliable support.

The xanthated cellulose derivatives prepared according to the present invention may be worked up into artificial materials, for instance threads or film or coatings or layers of any kind or impregnations of any kind, alone or in conjunction with other colloids, such as cellulose xanthate. Such combination with cellulose xanthate may be effected by mixing a solution of a cellulose derivative xanthate prepared according to the present invention with viscose, or by dissolving cellulose xanthate (sulphidised alkali cellulose) in a solution of a xanthated cellulose derivative, or by dissolving a xanthated cellulose derivative in viscose, or by conducting the present process so, that the carbon bisulphide is allowed to act in presence of caustic alkali upon a mixture of an organic substitution derivative of cellulose of the aforementioned types, particularly a cellulose ether or an ether-like compound of cellulose and cellulose, for example by treating alkali cellulose with a reagent capable of replacing one or more hydroxyl hydrogen atoms of the cellulose molecule by an organic radical or radicals, particularly by an unsubstituted or substituted alcohol radical or radicals, under such conditions that only part of the celllose contained in the alkali cellulose is converted into the corresponding cellulose derivative and thereafter, by acting upon with carbon bisulphide, converting the thus obtained reaction mass into a mixture of a xanthate of the corresponding cellulose derivative with cellulose xanthate. Also other alkali-soluble derivatives of cellulose or alkali-soluble cellulose hydrates or proteins or gelatine may be used as admixtures to the xanthated cellulose derivatives prepared according to the present invention.

Any suitable softening agents, such as glycerine or a glycol or a sugar, such as glucose or a soap or Turkey-red oil, or a drying or non-drying oil, or a halogen derivative of a di- or a polyvalent alcohol, particularly a halohydrin, such as a dichlorohydrin or a monochlorohydrin of glycerol or ethylene chlorohydrin may be added to the solutions of the xanthated cellulose derivatives prepared according to the present invention.

It is impossible to indicate every condition for success in every particular case and it is to be understood that preliminary experiments cannot be avoided to find what are the conditions necessary for success when using a particular kind of cellulose, a particular organic substitution derivative of cellulose, a particular proportion of carbon bisulphide and a particular method of xanthation.

In order to explain the nature of the present invention, the following specific examples are set forth. It is to be understood that the invention is not limited to these examples, to the precise proportions of ingredients, the times and temperatures and sequence of steps set forth; the parts are by weight:

*Example I A to G*

A. 1000 parts of air-dry cotton linters or woodpulp are steeped in 10,000 to 20,000 parts of caustic soda solution of 18 per cent. strength at 15 to 20° C. and the mixture allowed to stand at 15 to 20° C. for 1 to 24 hours. The resulting mass is then pressed to 3000 to 3500 parts and comminuted at 10 to 20° C. for 2 to 3 hours in a Werner-Pfleiderer shredder or another suitable comminuting machine or in a Werner-Pfleiderer xanthating machine whose blades may be dentated. Thereupon 100 to 200 parts of ethylene chlorohydrin or 100 to 280 parts of glycerol-alpha-monochlorohydrin or 100 to 300 parts of di-methyl sulphate or di-ethyl sulphate or monochloroacetic acid (for example in the form of a concentrated aqueous solution of sodium monochloroacetate) or 55 to 120 parts of ethylene oxide or 75 to 150 parts of propylene oxide or 90 to 180 parts of glycid, are added in one or several portions and the reaction mass is shredded for about 3 hours at 18 to 21° C.

The degree of etherification of the reaction product is low. Thus, when using 100 parts of dimethyl sulphate, and 300 parts of dimethyl sulphate and 300 parts of diethyl sulphate respectively, the etherified products will contain per one alkyl group, respectively about 12.7, 5.6 and 5.73 $C_6H_{10}O_5$-molecular units of cellulose.

Immediately thereafter or after the amount of caustic soda used up in the reaction (which amount has been determined by titration of the crude reaction mass) has been replaced (which replacement is preferably effected by means of a strong caustic soda solution, for example of 50 per cent. strength), 140 to 160 parts of carbon bisulphide are added and allowed to act, preferably with kneading, stirring, or otherwise agitating for 2 to 10 hours. The xanthated mass is dissolved in so much water and caustic soda as to yield a solution containing about 6 to 9 per cent. of the parent cellulose that has been used for the preparation of the cellulose derivative now xanthated and 6 to 9 per cent. of NaOH.

Before the addition of carbon bisulphide, the reaction mass, optionally after re-inforcement of the caustic soda solution, may be allowed to stand at rest at room temperature for 12 to 96 hours.

After having been aged at 15 to 18° C. for 12 to 36 or 48 hours, during which time it has been filtered two to three times, the solution may be worked up into shaped structures of various kinds and also used for dressing or coating or impregnating or printing of fabrics or sizing of yarn, the production of a few shaped structures being illustrated by way of the following examples to which the invention is not limited, since they are far from covering all kinds of shaped structures or other useful articles which are producible from the solutions of the products of the present invention.

(1) The cellulose ether xanthate solution (to which a softening agent, such as an oxytrimethylene-sulphide or glycerine or Turkey-red oil or another sulphonated oil or a sugar may be added) is extruded through a suitable hopper or slit into a suitable precipitating or coagulating bath, for example any coagulating bath known from the viscose art, such as sulphuric acid of 10 to 20 per cent. strength, or a bath containing 10 to 16 per cent. of sulphuric acid and 20 to 25 per cent. of sodium sulphate, or a bath containing 10 to 16 per cent. of sodium sulphate, 14 to 30 per cent. of magnesium sulphate and 2 to 16 per cent. of sulphuric acid etc.

To all the foregoing baths a certain quantity of an organic substance, for example 5 to 10 per cent. of glucose or glycerine and also some (for example 1 to 2 per cent.) zinc sulphate may be added.

The solutions of the cellulose ether xanthate may also be extruded into a solution of a salt, for example a 25 per cent. solution of ammonium sulphate and be then conducted from the salt solution bath into an acid bath, for instance any one of the acid baths set forth above by way of example.

The coagulating bath may be used at room temperature or below room temperature for example at 4 to 8° C. or at a raised temperature, for example at 35 to 45° C. or more.

The solidified film is washed with water and, optionally after having been contacted with a dilute solution of a substance having alkaline reaction, such as a dilute ammonia solution or a dilute solution of $Na_2CO_3$ or $NaHCO_3$ or the like and rewashed, dried in the usual manner.

The spinning into film and/or drying of the film may be conducted without any additional stretch or with more or less additional stretch.

The film may be treated before or after drying with an aqueous solution of glycerol (for instance of 4 to 10 per cent. strength), or glycol in order to increase its flexibility.

As a matter of course, the film may also be treated with any of the known moisture-proofing or water-proofing agents or compositions.

The film may be treated either in the course of its manufacture or in the finished state with a hardening agent, such as formaldehyde or the like.

The manufacture of narrow strips and artificial straw follows automatically from the foregoing example.

(2) The cellulose ether xanthate solution is, in a known manner, extruded through a spinning nozzle or spinning nozzles into any coagulating or precipitating bath known in the viscose silk art, for example into one of the precipitating or coagulating baths or combinations of two baths referred to in (1).

The solidified thread is thoroughly washed with water and dried in the usual manner.

The spinning operation may be conducted with or without additional stretch which may be effected, for example, by introducing into the path which the thread travels from the spinning nozzle to the collecting device, such as bobbin or centrifuge, one or more brakes, such as godets or differential rollers or glass or metal rods arranged angularly to each other or the like. Additional stretch can be given the thread also by a high speed of spinning, for example of 80 to 100 meters or more per minute.

The artificial threads may be treated either in the course of their manufacture or in the finished state with a hardening agent, such as formaldehyde or the like.

(3) A mixture of 50 parts of viscose (prepared in the usual manner and containing 6 to 10 per cent. by weight of cellulose) and 50 parts of the cellulose ether xanthate is spun into film or artificial threads as in (1) or (2).

(4) The process is conducted as in (1) or (2) or (3), but with the difference that a bath is used which has a plasticising effect on the freshly coagulated material, for example sulphuric acid of 25 to 70 per cent. strength or another mineral acid, such as hydrochloric acid or phosphoric acid or nitric acid of a strength exerting a plasticising action on the freshly coagulated film or thread equivalent to the plasticising action of sulphuric acid of 25 to 70 per cent. strength, or a strong zinc chloride solution free from, or containing, some hydrochloric acid or one of the plasticising baths referred to in my British Patent 437,032.

The plasticising may be effected by means of one bath or of two baths. In other words: The solution may be extruded directly into a bath which has a coagulating effect on the shaped solution and a plasticising effect on the freshly coagulated film or thread (for example one of the plasticising baths set out above) or it may be extruded into a bath which has no or only little plasticising effect on the shaped solution (such as one of the baths set out in (1) or (2) and conducted from there into a plasticising bath (for instance one of the plasticising baths set forth above).

As a matter of course, also such film or threads as have a reduced lustre or are entirely dull can be produced from the xanthate solution by any method known from the artificial silk art. The same holds good with threads within which gas bubbles or hollow spaces are distributed.

The manufacture of staple fibre follows automatically from the foregoing.

(5) A woven fabric, such as a cotton fabric is provided by means of a suitable machine, such as a backfilling machine or a padding machine or a spreading machine, with one or more coatings of the cellulose ether xanthate solution, to which solution a filling material such as talc or china clay or zinc white or a dye-stuff or pigment, such as a lake or lampblack or mica and/or softening agent, for instance an oxy-trimethylene-sulphide (see my U. S. Patent No. 1,018,329) or a soap or Turkey-red oil or a drying or non-drying oil etc. etc. may be added. The coated or impregnated or filled material is then introduced directly or after intermediate drying and/or steaming into a precipitating bath as referred to in (1) or (4) and is then washed and dried.

The textile material may be treated before or after drying with a softening agent, such as a soap or Turkey-red oil or glycerol or the like.

(6) The procedure is as in (5), but with the exception that the cellulose ether xanthate solution is mixed with a solution of starch or dextrin or any other colloid known in the finishing art.

(7) The process is conducted as in (5) or (6), but with the exception that measures are taken towards incorporating with the final material deposited in or on the fibres of the fabric gas bubbles or hollow spaces. This may be done in any known manner either by dispersing or otherwise distributing a gas, such as air or hydrogen or nitrogen or the like, in the solution or by introducing into the solution a substance (for example sodium carbonate or sodium sulphide) which in the subsequent coagulating or precipitating step will evolve a gas.

(8) The process is conducted as in (5) to (7), but with the difference that, before being applied to the fabric, the solution is converted into a lather according to the process described in my British Patent No. 390,517.

Examples for sizing yarn follow automatically from Examples 5 to 8.

(9) The cellulose ether xanthate solution is mixed with a dye-stuff or with a pigment, such as a lake or lampblack or zinc white or finely divided mica and then printed in a rouleaux printing machine or stencilled on a cotton fabric. After being printed, the cotton fabric is, if desired after being dried, introduced into one of the non-plasticising or plasticising baths or combinations of baths named under (1) and (4) and, after having been run through the bath or the baths, washed and dried.

(10) The cellulose ether xanthate solution may be used also for the pasting together of two or more sheets of paper or card boards or cotton fabrics, the materials pasted together being then, if desired after intermediate drying, introduced into one of the non-plasticising or plasticising baths or combinations of baths set out above under (1) and (4).

(11) Thick plates can be made by accordingly shaping concentrated solutions or pastes of the cellulose ether xanthate and, optionally after intermediate drying, treating them with one of the precipitating baths or combinations of precipitating baths set out above under (1) and (4).

B. The process is conducted as in A, but with the difference that, before being dissolved, or at any other stage of the xanthating operation, the reaction mass is cooled down to a temperature between room temperature and 0° C. or to 0° C. or to minus 5 or minus 10° C. and kept at that temperature with stirring or kneading or otherwise agitating for 20 minutes to 2 hours or longer.

C. Mode of procedure as in A or B, but with the exception that the dissolving of the xanthated mass in caustic soda solution is conducted in such a manner that, at any stage of the dissolving step, for example at the end of the dissolving step, the complete or incomplete solution is, with stirring or kneading or otherwise agitating, cooled down to a temperature between room temperature and 0° C. or to 0° C. or to a temperature below 0° C., for example to minus 5 or minus 10° C. and then, if desired, brought back to room temperature or any other desired temperature between 0° C. and room temperature or higher.

D. Mode of procedure as in any one of the Examples A to C, but with the exception that the reaction of the alkali cellulose with the etherifying agent or etherifying agents is conducted at 5 to 10° C.

E. Mode of procedure as in any one of the Examples A to C, but with the exception that the reaction of the alkali cellulose with the etherifying agent is conducted at 50° C.

F. The process is conducted as in any one of the Examples A to E, but with the difference that the alkali cellulose is allowed to mature for 12 to 96 hours or longer at 10 to 25° C.

G. The process is conducted as in any one of the Examples A to F, but with the exception that after the 3 hours stirring, kneading or shredding provided for in A, the reaction mass is allowed to stand at room temperature for 20 to 96 hours or longer.

*Example II A to G*

The process is conducted as in any one of the Examples I A to G, but with the exception that, instead of 140 to 160 parts, 70 to 100 parts of carbon bisulphide are added, the age of the xanthate solution at the time of working it up into a shaped structure being 8 to 24 or 36 to 48 hours.

*Example III G to G*

The process is conducted as in any one of the Examples I A to G, but with the exception that, instead of 140 to 160 parts, 40 to 65 parts of carbon bisulphide are added, the age of the xanthate solution at the time of working it up into a shaped structure being 8 to 24 or 36 hours.

*Example IV A to G*

A. 1000 parts of air-dry cotton linters or woodpulp are steeped in 10,000 to 20,000 parts of caustic soda solution of 18 per cent. strength at 15 to 20° C. and the mixture allowed to stand at 15 to 20° C. for 1 to 24 hours. The resulting mass is then pressed to 3000 to 3500 parts and comminuted at 10 to 20° C. for 2 to 3 hours in a Werner-Pfleiderer shredder or another suitable comminuting machine or in a Werner-Pfleiderer xanthating machine whose blades may be dentated. Thereupon 100 to 200 parts of ethylene chlorohydrin or 100 to 280 parts of glycerol-alpha-mono-chlorohydrin or 100 to 300 parts of di-methyl sulphate or di-ethyl sulphate or monochloroacetic acid (for example in the form of a concentrated aqueous solution of sodium monochloroacetate) or 55 to 120 parts of ethylene oxide or 75 to 150 parts of propylene oxide or 90 to 180 parts of glycid, are added in one or several portions and the reaction mass is shredded for about 3 hours at 18 to 21° C.

Immediately thereafter the crude product or the reaction as such or after having been neutralised or acidified is washed with water and then preferably pressed, whereupon the washed and pressed product is, in a suitable machine, for example in a Werner-Pfleiderer xanthating machine whose blades may be dentated or a kneading machine or a shredder or a rotating drum or the like, at 15 to 16° C. well mixed with such an amount of caustic soda and water as, together with the amount of water present in the mass, to contain 10,000 to 20,000 parts of caustic soda solution of 18 per cent. strength.

After having stood at room temperature or thereabouts for 1 to 3 hours, the mass is pressed to 3400 to 4200 parts and then comminuted in a shredder or another suitable comminuting machine for 2 to 3 hours at 11 to 15° C. After shredding and optionally maturing at 10 to 25° C. for 12 to 96 hours, 140 to 160 parts of carbon bisulphide are added and the reaction mass treated therewith under kneading or shredding or stirring or otherwise agitating (for instance in a rotating drum) for 3 to 10 hours. The xanthated mass is dissolved in so much water and caustic soda as to yield a solution containing about 6 to 8 per cent. of the parent cellulose that has been used for the preparation of the cellulose derivative now xanthated and 6 to 9 per cent. of NaOH.

After having been aged at 15 to 18° C. for 12 to 36 hours, during which time it has been filtered two or three times, the cellulose ether xanthate solution may be converted into shaped structures according to any one of the methods described by way of example above under (1) to (11).

B. The process is conducted as in A, but with the difference that, before being dissolved, or at any other stage of the xanthating operation, the reaction mass is cooled down to a temperature between room temperature and 0° C. or to 0° C. or to minus 5 or minus 10° C. and kept at that temperature with stirring or kneading or otherwise agitating for 20 minutes to 2 hours or longer.

C. Mode of procedure as in A or B, but with the exception that the dissolving of the xanthated mass in caustic alkali solution is conducted in such a manner that at any stage of the dissolving step, for example at the end of the dissolving step, the complete or incomplete solution is, with stirring or kneading or otherwise agitating, cooled down to a temperature between room temperature and 0° C. or to 0° C. or a temperature below 0° C. for example minus 5 or minus 10° C. and then, if desired brought back to room temperature or any other desired temperature between 0° C. and room temperature or higher.

D. Mode of procedure as in any one of the Examples A to C, but with the exception that the reaction of the alkali cellulose with the etherifying agent or etherifying agents is conducted at 5 to 10° C.

E. Mode of procedure as in any one of the Examples A to C, but with the exception that the reaction of the alkali cellulose with the etherifying agent is conducted at 50° C.

F. The process is conducted as in any one of the Examples A to E, but with the difference that the alkali cellulose is allowed to mature for 12 to 96 hours or longer at 10 to 25° C.

G. The process is conducted as in any one of the Examples A to F, but with the exception that after the 3 hours stirring, kneading or shredding provided for in A, the reaction mass is allowed to stand at room temperature for 20 to 96 hours.

*Example V A to G*

The process is conducted as in any one of the Examples IV A to G, but with the exception that, instead of 140 to 160 parts, 70 to 100 parts of carbon bisulphide are added, the age of the xanthate solution at the time of working it up into a shaped structure being 8 to 24 or 36 to 48 hours.

*Example VI A to G*

The process is conducted as in any one of the Examples IV A to G, but with the difference that, instead of 140 to 160 parts, 40 to 65 parts of carbon bisulphide are added, the age of the xanthate solution at the time of working it up into a shaped structure being 8 to 24 or 36 hours.

*Example VII A to G*

The process is conducted as in any one of the Examples IV A to G to VI A to G, but with the difference that, instead of being alkalised with an excess of caustic soda solution and then freed from the excess of the caustic soda solution by pressing, the washed and pressed product of the treatment of the alkali cellulose with the etherifying agents mentioned above is, in any suitable apparatus, for example a Werner-Pfleiderer xanthating machine or a Werner-Pfleiderer shredder or a Werner-Pfleiderer kneading machine, mixed with such an amount of caustic alkali solution of appropriate strength as to yield a mixture containing 1000 parts of the dry residue of the washed and pressed product of the etherifying operation and 1000 to 2400 parts of caustic soda solution of 18 per cent, strength, the xanthating of the thus obtained product and the bringing it into solution being conducted as in any one of the Examples IV A to G to VI A to G.

*Example VIII A to G*

The process is conducted as in any one of the Examples IV A to G to VI A to G, but with the difference that, instead of being alkalised with an excess of caustic soda solution and then freed from the excess of the caustic soda solution by pressing, the washed and pressed product of the treatment of the alkali cellulose with ethylene chlorohydrin or monochlorohydrin or di-methyl sulphate or di-ethyl sulphate or monochloracetatic acid (for example in the form of sodium monochloroacetate) or ethylene oxide or propylene oxide or glycid is in a suitable apparatus, for example a Werner-Pfleiderer xanthating machine or a Werner-Pfleiderer shredder or a Werner-Pfleiderer kneading machine, mixed with such an amount of caustic alkali solution of appropriate strength as to yield a mixture containing so much of the dry residue of the washed and pressed product of the etherifying operation and caustic alkali solution of 18 per cent. strength as, after xanthation (which is performed as described in any one of the Examples IV A to G to VI A to G) and on addition of an appropriate quantity of water to yield a solution containing about 6 to 9 per cent. of the dry residue of the washed and pressed reaction product in caustic soda solution of 6 to 9 per cent. strength.

*Example IX A to G*

The process is conducted as in any one of the Examples IV A to G to VIII A to G, but with the exception that the crude etherified product is, without being washed, alkalised with 6600 to 13,600 parts of caustic soda solution of 18 per cent. strength at 15° C. and then, by pressing, shredding and sulphidising, worked up into the final xanthate as described in any one of the Examples IV A to G to VIII A to G and the latter into any one of the shaped structure set out above under (1) to (11).

Example X A to F

A. 1000 parts of air-dry cotton linters or woodpulp are steeped in 10,000 to 20,000 parts of caustic soda solution of 18 per cent. strength at 15 to 20° C. and the mixture allowed to stand at 15 to 20° C. for 1 to 24 hours. The resulting mass is then pressed to 3000 to 3500 parts and comminuted at 10 to 20° C. for 2 to 3 hours in a Werner-Pfleiderer shredder or another suitable comminuting machine or in a Werner-Pfleiderer xanthating machine whose blades may be dentated. Thereupon 100 to 200 parts of ethylene chlorohydrin or 100 to 280 parts of glycerol-alpha-monochlorohydrin or 100 to 300 parts of di-methyl sulphate or di-ethyl sulphate or monochloroacetic acid (for example in the form of a concentrated aqueous solution of sodium monochloroacetate) or 55 to 120 parts of ethylene oxide or 75 to 150 parts of propylene oxide or 90 to 180 parts of glycid, are added in one or several portions and the reaction mass is shredded for about 3 hours at 18 to 21° C. Thereafter the reaction mass is in the crude state or in the washed and pressed state mixed with such an amount of caustic soda solution of appropriate strength as to yield a mixture of 1000 parts of the cellulose derivative contained in the crude reaction mass or of the dry residue of the washed and pressed product of the reaction and 11,100 to 19,000 parts of caustic soda solution of 6 to 9 per cent. strength. The mixture is now in a Werner-Pfleiderer xanthating machine or another appropriate machine stirred at room temperature or at any temperature between room temperature and 0° C. or at 0° C. or below 0° C. for example at minus 2 or minus 5 or minus 10° C. for 20 minutes to 2 hours, whereupon 140 to 160 parts of carbon bisulphide are added and the mixture kept wtih stirring or shaking or agitating for 2 to 10 hours at room temperature or at 10° C.

After having been aged at 15 to 18° C. for 12 to 36 or 48 hours and after, during ageing, having been filtered two to three times, the xanthate solution thus obtained is worked up into any one of the shaped structures set out above under (1) to (11).

B. The process is conducted as in A, but with the difference that, after having been treated with carbon bisulphide at room temperature or at 10° C. for 2 to 10 hours, the reaction mass is cooled down to a temperature between room temperature and 0° C. or to 0° C. or to a temperature below 0° C., for instance to minus 5 to minus 10° C , kept at this temperature for 20 to 30 minutes or even 1 to 2 hours with stirring, kneading or otherwise agitating and then brought back to room temperature.

C. Mode of procedure as in A or B, but with the exception that the reaction of the alkali cellulose with the etherifying agent or etherifying agents is conducted at 5 to 10° C.

D. Mode of procedure as in any one of the Examples A or B, but with the exception that the reaction of the alkali cellulose with the etherifying agent is conducted at 50° C.

E. The process is conducted as in any one of the Examples A to C, but with the difference that the alkali-cellulose is allowed to mature at 10 to 25° C. for 12 to 96 hours or longer.

F. The process is conducted as in any one of the Examples A to E, but with the exception that after the 3 hours stirring, kneading or shredding of the etherifying reaction mass provided for in A, the reaction mass is allowed to stand at room temperature for 20 to 96 hours or longer.

Example XI A to F

The process is conducted as in any one of the Examples X A to F, but with the exception that, instead of 140 to 160 parts, 70 to 100 parts of carbon bisulphide are added, the age of the xanthate solution at the time of working it up into a shaped structure being 8 to 24 or 36 to 48 hours.

Example XII A to F

The process is conducted as in any one of the Examples X A to F, but with the difference that, instead of 140 to 160 parts, 40 to 65 parts of carbon bisulphide are added, the age of the xanthate solution at the time of working it up into a shaped structure being 8 to 24 or 36 hours.

Example XIII

The process is conducted as in any one of the Examples I A to G to IX A to G or X A to F to XII A to F, but with the difference that, instead of the amounts of etherifying agents mentioned above, 200 to 400 parts of ethylene chlorohydrin or 150 to 600 parts of glycerol alpha-monochlorohydrin or 300 to 500 parts of di-methyl sulphate or di-ethyl sulphate or monochloroacetic acid (for example in the form of a concentrated aqueous solution of monochloroacetate) or 120 to 240 parts of ethylene oxide or 150 to 300 parts of propylene oxide or 180 to 360 parts of glycid are used for the preparation of the cellulose ether.

Example XIV

The process is conducted as in any one of the Examples I A to G to IX A to G or XII A to F, but with the difference that, instead of the single etherifying agents there given, a mixture of 100 to 200 parts of ethylene chlorohydrin or of 100 to 200 parts of glycerol alpha-monochlorohydrin or of 55 to 120 parts of ethylene oxide or of 75 to 150 parts of propylene oxide or of 90 to 180 parts of glycid and 100 to 200 parts of di-ethyl sulphate or di-methyl sulphate or a mixture of 100 to 200 parts of di-methyl sulphate and 100 to 200 parts of di-ethyl sulphate, or a mixture of 100 to 200 parts of ethylene chlorohydrin or of 100 to 200 parts of monochlorohydrin or of 100 to 200 parts of di-methyl sulphate or di-ethyl sulphate or of 55 to 120 parts of ethylene oxide or of 75 to 150 parts of propylene oxide or of 90 to 180 parts of glycid and 100 to 300 parts of monochloroacetic acid (for example in the form of sodium monochloroacetate) is used in the preparation of the cellulose ether.

Example XV

The process is conducted as in Example I A to G to IX A to G, or X A to F to XII A to F, but with the difference that, instead of the single etherifying agents given above a mixture of 50 parts of ethylene chlorohydrin or of 70 parts of monochlorohydrin or of 30 to 40 parts of ethylene oxide or of 70 to 80 parts of propylene oxide or of 80 to 120 parts of glycid and 100 to 200 parts of di-ethyl sulphate or di-methyl sulphate or 100 to 300 parts of monochloroacetic acid (for example in the form of sodium monochloroacetate), or a mixture of 50 to 100 parts of di-methyl sulphate and 100 to 200 parts of di-ethyl sulphate or 100 to 300 parts of monochloroacetic acid (for example in the form of sodium monochloroacetate), or a mixture of 50 to 100 parts of di-ethyl sulphate or of di-methyl sulphate and 100 to 300 parts of monochloroacetic acid (for example in the form of sodium monochloroacetate) is used in the preparation of the cellulose ether.

Example XVI

The process is conducted as in Example I A to G to IX A to G, or X A to F to XII A to F, but with the difference that, instead of the single etherifying agents mentioned above, a mixture of 25 to 50 parts of ethylene chlorohydrin or of 30 to 60 parts of monochlorohydrin or of 20 to 30 parts of ethylene oxide and 50 parts of di-ethyl sulphate or di-methyl sulphate or 50 parts of monochloroacetic acid (for example in the form of sodium monochloroacetate), or a mixture of 25 to 50 parts of di-methyl sulphate and 50 parts of di-ethyl sulphate or monochloroacetic acid (for example in the form of sodium monochloroacetate) or a mixture of 25 to 50 parts of di-ethyl sulphate or di-methyl sulphate and 50 parts of monochloroacetic acid (for example in the form of sodium monochloroacetate) is used in the preparation of the cellulose ether.

Example XVII

The process is conducted as in Example I A to G to IX A to G, or X A to F to XII A to F, but with the exception that, instead of the etherifying agents named above, 300 to 1200 parts of chloro-ethyl-diethylamine hydrochloride are added.

Example XVIII

The process is conducted as in Examples I A to G to IX A to G, or X A to F to XII A to F, but with the difference that, instead of the etherifying agents named above, 100 to 500 parts of the product of Example 1 of my U. S. Patent 2,167,661 purified according to the first or second method given in that example are used.

Example XIX

The process is conducted as in any one of the preceding examples, but with the difference that the cellulose ethers used in these examples are in the form of the crude reaction masses (when necessary with addition of some concentrated caustic alkali solution in replacement or in excess over the caustic alkali used up in the reaction) or in the isolated form, i. e. in the form of the washed and, optionally dried, reaction products or in the purified form, treated in presence of alkali with 50 to 200 parts of ethyl chloride or with 70 to 150 parts of propyl chloride or 100 to 600 parts of benzyl chloride or with 50 to 200 parts of ethyl chloride at 50 to 120° C. or with 40 to 180 parts of methyl chloride at 50 to 110° C. and thereafter xanthated and dissolved as described in any one of the preceding examples, and the solution thus obtained may be worked up into shaped structures as described in Example I under (1) to (11).

Example XX

The process is conducted as in any one of the preceding examples, but with the exception that instead of to 3000 to 3500, the alkali cellulose used in the preparation of the cellulose ether is pressed to 2000 parts.

Example XXI

The process is conducted as in any one of the Examples I to XIX, but with the exception that, instead of to 3000 to 3500, the alkali cellulose used in the preparation of the cellulose ether is pressed to 1300 to 1600 parts.

Example XXII A to H

A. 1000 parts of air-dry cotton linters or woodpulp are steeped in 10,000 to 20,000 parts of caustic soda solution of 18 per cent. strength at 15° to 20° C. and the mixture allowed to stand at 15° to 20° C. for 1 to 24 hours. The resulting mass is then pressed to 3000 to 3500 parts and comminuted at 10° to 18° C. for 2 to 3 hours in a Werner-Pfleiderer shredder or another suitable comminuting machine. Thereupon the alkali cellulose is placed in a rotating autoclave or an autoclave provided with a stirring device, 200 parts of precooled ethyl chloride are added, and the material is heated to 60° to 80° C. and kept at this temperature for 12 to 24 hours.

The product of the reaction is xanthated and dissolved as described in any one of the preceding examples and the solution may be worked up into artificial structures as described in Example I under (1) to (11).

B. The process is conducted as in Example A, but with the difference that, instead of 200 parts, 300 to 1500 parts of ethyl chloride are used in the preparation of the cellulose ether.

C. The process is conducted as in Example A, but with the exception that, instead of 200 parts, 75 to 100 parts of ethyl chloride are used in the preparation of the cellulose ether.

D. The process is conducted as in Example A, but with the exception that, instead of 200 parts of ethyl chloride, a mixture of 50 parts of ethyl chloride and 50 to 200 parts of ethylene chlorohydrin or 25 to 140 parts of ethylene oxide or 100 to 200 parts of di-methyl sulphate or 100 to 200 parts of methyl chloride or 100 to 300 parts of benzyl chloride or of monochloroacetic acid (for example in the form of sodium monochloroacetate) is used.

E. The process is carried out as in any one of the Examples A to D, but with the difference that the etherifying operation is conducted at 50° C.

F. The process is carried out as in any one of the Examples A to D, but with the difference that the etherifying operation is conducted at 95° C.

G. The process is conducted as in any one of the Examples A to F, but with the exception that in the etherifying operation the duration of the heating is only 3 to 6 hours.

H. The process is conducted as in any one of the Examples A to G, but with the difference that the alkali cellulose is allowed to mature for 12 to 96 hours or longer.

If there is no excess of ethyl chloride over the proportion calculated on the proportion of NaOH contained in the alkali cellulose, the etherifying reaction may be conducted at a temperature exceeding 100° C., for example at 110 to 130° C. or higher.

Example XXIII A to H

The process is conducted as in any one of the Examples XXII A to H, but with the difference that, instead of to 3000 to 3500 parts, the alkali cellulose used in the preparation of the cellulose ether is pressed to 2000 parts.

Example XXIV A to H

The process is conducted as in any one of the Examples XXII A to H, but with the exception that, instead of to 3000 to 3500 parts, the alkali cellulose used in the preparation of the cellulose ether is pressed to 1350 to 1600 parts.

Example XXV

Any one of the ethyl celluloses obtained in the Examples XXII A to C and E to H, or XXIII A to C and E to H or XXIV A to C and E to H may be hydroxy-alkylated in the following manner.

The NaOH content of the crude reaction mixture resulting from the ethylating operation in any one of the Examples XXII A to C and E to H, XXIII A to C and E to H or XXIV A to C and E to H is determined by analysis, whereupon optionally after compensating the amount of NaOH used up in the alkylating reaction by supplying to the reaction mixture, at least the equivalent quantity of NaOH in the form of powder or of a strong solution, for instance of 30 to 50 per cent. strength, the reaction mixture is treated with 50 to 150 parts of ethylene chlorohydrin or with 70 to 210 parts of glycerol alpha-monochlorohydrin or with 25 to 75 parts of ethylene oxide or with 32 to 100 parts of propylene oxide as described in any one of the Examples I to XVI for alkali cellulose.

The thus obtained ethyl-hydroxy-ethyl cellulose or ethyl-1:2-dihydroxypropyl cellulose or propyl cellulose is xanthated and dissolved as described in any one of the preceding examples, and the solution thus obtained may be worked up into shaped structures as described in Example I under (1) to (11).

Example XXVI

The process is conducted as in Example XXV, but with the exception that not the crude, but the washed and optionally dried reaction product of any one of the Examples XXII A to C and E to H, or XXIII A to C and E to H, or XXIV A to C and E to H is hydroxy-alkylated.

For this purpose the washed ethyl cellulose resultant from any one of the examples set forth in the foregoing paragraph which, if desired, may be dried, is steeped in an excess of a caustic soda solution of such strength as, together with the water (if any) adhering to the ethyl cellulose, to yield a caustic soda solution of 18 per cent. strength and the thus obtained product pressed down to 3000 to 4000 parts. The press cake is then shredded in the usual manner and then hydroxy-alkylated and worked up as described in Example XXV.

Instead of being made by steeping the ethyl cellulose in an excess of caustic soda solution and removing the excess by pressing, the alkali ethyl cellulose may be prepared by mixing the washed or washed and dried ethyl cellulose in a mixing apparatus, for example in a Werner-Pfleiderer xanthating machine or a shredder with such an amount of a caustic soda solution of appropriate strength as together with the water (if any) adhering to the ethyl cellulose to yield 2000 to 3000 parts of a caustic soda solution of 18 per cent. strength.

Example XXVII

The process is conducted as in any one of the Examples I A to G to IX A to G or X A to F to XII A to F or XIII to XXVI, but with the difference that, instead of the caustic soda solution of 18 per cent. strength, a caustic soda solution of 12 per cent. strength is used for the preparation of the alkali cellulose.

Example XXVIII

The process is conducted as in any one of the Examples I A to G to IX A to G or X A to F to XII A to F or XIII to XXVI, but with the difference that, instead of the caustic soda solution of 18 per cent. strength, a caustic soda solution of 9 per cent. strength is used for the preparation of the alkali cellulose.

Example XXIX

The process is conducted as in any one of the Examples I A to G to IX A to G or X A to F to XII A to F or XIII to XXVI, but with the difference that, instead of the caustic soda solution of 18 per cent. strength, a caustic soda solution of 10 per cent. strength is used for the preparation of the alkali cellulose.

Example XXX

The process is conducted as in any one of the Examples I A to G to IX A to G or X A to F to XII A to F or XIII to XXVI, but with the difference that, instead of the caustic soda solution of 18 per cent. strength, a caustic soda solution of 5 per cent. strength is used for the preparation of the alkali cellulose.

Example XXXI

The process is conducted as in any one of the Examples I A to G to IX A to G or X A to F to XII A to F or XIII to XXVI, but with the exception that, instead of the caustic soda solution of 18 per cent. strength, a caustic soda solution of 5 to 12 per cent. strength is used for the preparation of the alkali cellulose and that, instead of being pressed to 2000, or 3000 to 3400 parts, the alkali cellulose is pressed to 1300 to 1500 parts.

Example XXXII

The process is conducted as in any one of the Examples I to XX, but with the difference that, before being etherified, the alkali cellulose is dried, preferably in vacuo or in a counter-current of air at room temperature or at a higher temperature, for example at 40 to 60° C. completely, i. e. to constant weight or to a weight between the original weight of the alkali cellulose and perfect dryness.

Instead of being prepared by steeping the cellulose in an excess of caustic alkali solution and removing the excess by pressing, in any one of the preceding examples the alkali cellulose may also be prepared by mixing the cellulose in a suitable mixing apparatus, for example a shredder or a kneading machine or a mill or a disintegrator or an edge runner or the like with the amount of caustic soda solution corresponding with the quantity remaining in the alkali celluloses used in the relative examples after pressing. The mixing of the cellulose with the caustic alkali solution may be conducted at room temperature or at a temperature above room temperature, for example at 24 to 30° C., or with cooling, for example to 15 or 10° C. or lower. The time of mixing may be varied within wide limits, for example from 1 hour to 24 hours or longer.

In the foregoing examples, any excess of the etherifying agents which has not been used up in the reaction may be recovered by condensation or distillation.

Instead of the cellulose ethers used in the foregoing examples, other cellulose derivatives can be used which are prepared by acting on cellulose in presence of alkali with one or more reagents which have a tendency to react with cellulose so as to cause introduction of an organic radical in place of the hydrogen of the hydroxyl, for example cellulose compounds which are xanthated in the process of my British Patents 367,920, 368,288, 390,519.

In the foregoing examples, instead of cellulose, any conversion product of cellulose which is insoluble or only scarcely soluble in caustic alkali solution may be used as parent material—for instance, a cellulose hydrate or a hydrocellulose produced by chemical action on cellulose, such as mercerisation with subsequent washing and, if desired, drying; or by treating with a strong inorganic or organic acid or a mixture of both; or by heating with a dilute solution of a mineral acid; or by treatment with a zinc halide; or by mechanical process, such as grinding in presence of water or the like; or an oxy-cellulose—in short any body of the cellulose group which has been proposed for the manufacture of viscose or of any other cellulose derivatives or compounds or of ammoniacal-copper-oxide-cellulose.

In the foregoing examples, a small amount of a catalyser, for example of a metal salt, such as a copper salt, nickel salt, silver salt, zinc salt, iron salt, or a peroxide, for instance benzoyl peroxide or ammonia or primary, secondary or tertiary organic bases, such as a mono- or di-alkyl aniline or a mono-, di, or tri-alkyl amine or an aralkyl amine, or an oxy-alkyl amine or the like may be added to the alkali cellulose or reacting mixture.

If feasible or expedient, in the foregoing examples, instead of the halogenated etherifying agents used therein, equivalent quantities of the corresponding brominated or iodinated reagents (for example alkyl bromides or alkyl iodides or monobromohydrin or monoiodohydrin or ethylene bromohydrin or ethylene iodohydrin or bromoacetic acid or iodo-acetic acid, etc.) may be used.

If feasible or expedient, in the foregoing examples instead of the alkylating and hydroxyalkylating agents used therein, equivalent quantities of alkylating or hydroxy-alkylating agents containing other alkyl or hydroxy-alkyl groups can be used, for instance methyl chloride or propyl chloride or an amyl chloride or a butyl chloride or propylene chlorohydrin or butylene chlorohydrin.

If feasible or expedient, instead of ethylene or propylene oxide, other alkylene oxides, such as butylene oxide, in short all suitable compounds which contain an ethylene oxide ring can be used in the foregoing examples.

If feasible or expedient, instead of alkyl halides or di-alkyl sulphates, equimolecular amounts of their substitution or addition derivatives, for example halogen alkyl amines, such as halogen-alkyl-dialkyl amines or their hydrochlorides can be employed in the foregoing examples.

If feasible or expedient, in the foregoing examples relating to hydroxy-acid derivatives of cellulose, instead of the chloroacetic acid, equimolecular quantities of an ester of chloroacetic acid, for example methyl- or ethyl chloroacetate, or a halogen derivative of a homologue of acetic acid, for instance alpha-chloropropionic acid or alpha-chloro-isobutyric acid or alpha-bromo-propionic acid or alpha-bromo-isobutyric acid or the like or an alkali salt or an ester thereof may be employed.

If feasible or expedient, in the foregoing examples the coagulating or precipitating baths described in my British patent 457,031, can be used in the working up of the products of the invention into shaped structures or other useful articles.

If desired, the extensibility of the shaped structures, such as threads or film or coatings or the like produced according to the present invention may be increased by treating them either in the course of their manufacture, for example after coagulation and washing or in the finished wet or dry state with suitable shrinking agents, for example with some of the shrinking agents mentioned in my U. S. Patents Nos. 1,989,098, 2,001,621, 1,989,100, 1,989,101, 2,004,875 and 2,004,876.

As a guiding line with regard to the question whether or not the alkali cellulose should be allowed to mature before being brought together with the etherifying agent or agents may, among others, serve the desired viscosity of the xanthate solution which is to be worked up into shaped structures and in connection therewith the viscosity of the kind of cellulose contemplated. If it is desired to give the solution a definite viscosity, then the alkali cellulose produced from the kind of cellulose contemplated is subjected to a maturing process, if without maturing this kind of cellulose yields a higher viscosity. If, however, the xanthate solution exhibits from the first the desired grade of viscosity that is without maturing, the maturing is superfluous. Now, as the viscosities of the different kinds of cellulose on the market (linters and wood-pulp) differ very much from one another, the question of maturing depends in most cases on the one hand on the viscosity desired of the xanthate solution intended for the manufacture of shaped structures, and on the other hand on the viscosity of the kind of cellulose being worked.

Wherever the context permits, the expressions "alkali-soluble cellulose ether," "cellulose ether which is soluble or at least partially soluble in caustic alkali solution" and "cellulose ether which is at least partially soluble in caustic alkali solution" are intended to include such simple and mixed cellulose ethers as will completely or almost completely dissolve in caustic alkali solution at room temperature and at a lower temperature, for example at a temperature between room temperature and 0° C. or lower and such simple and mixed cellulose ethers as will not dissolve (completely or incompletely) directed in caustic alkali solution at room temperature, but as can be brought into solution therein by cooling their suspensions or incomplete solutions in caustic alkali solution to a temperature between room temperature and 0° C. or to 0° C. or to a temperature below 0° C., for example to minus 5° C. or to minus 10° C. or lower and then allowing the temperature to rise to 0° C. or above 0° C. for example to a temperature between 0° C. and 20° C. and such simple or mixed cellulose ethers as will not directly dissolve in caustic alkali solution at room temperature or at a temperature between room temperature and 0° C. and at 0° C., but as can be partially or completely brought into solution therein at room temperature and/or at a temperature between room temperature and 0° C. or at 0° C. by cooling their suspensions or incomplete solutions to a temperature below 0° C., for example to minus 5° C. or minus 10° C. or lower and then allowing the temperature to rise to 0° C. or above 0° C., for example to room temperature.

The term "cellulose" used in the description and claims is, wherever the context permits, intended to include cellulose, its conversion and oxidation products, such as cellulose hydrate, hydrocellulose, oxycellulose, acidcellulose and the like, in short, any body of the cellulose group which has been proposed as starting material for the preparation of cellulose derivatives or cellulose compounds of any kind.

The term "alkali cellulose," wherever the context permits, means alkali cellulose prepared in the usual manner, namely by steeping cellulose in caustic alkali solution and removing the excess of the latter by pressing or by mixing cellulose with such an amount of caustic alkali solution as is desired to be present in the final alkali cellulose.

The expression "etherification" in the specification and claims covers alkylation or aralkylation or hydroxyalkylation or production of hydroxy-acid derivatives, "ether" covers simple alkyl and aralkyl and hydroxy-alkyl and hydroxy-acid ethers and also mixed ethers, for example the mixed ethers set forth in the paragraph headed "Mixed ethers" above, "etherifying agents" covers alkylating and aralkylating and hydroxy-alkylating agents and halogen fatty acids.

In the specification and claims, wherever the context permits, the expression "cellulose ether" is intended to include simple and mixed aliphatic and aromatic cellulose ethers of any kind, i. e. any cellulose compound containing an alcohol radical linked ether-fashion with the cellulose molecule regardless of whether the alcohol radical is unsubstituted or substituted by any organic group or radical or by a suitable inorganic element, such as nitrogen or sulphur or a group containing an inorganic element, such as a nitrogen hydrogen group or a sulphur hydrogen group, in short any group or radical which is known as substituent in alcohol radicals.

In the specification and claims, wherever the context permits, the term "unsubstituted or substituted alcohol radical" is intended to include unsubstituted or substituted alcohol radicals of any kind, for example unsubstituted or substituted alkyl radicals or unsubstituted or substituted hydroxy-alkyl radicals and hydroxy-acid radicals, and the numerous others hereinabove mentioned.

The expression "halohydrin" used in the specification and the claims includes, wherever the context permits, the compounds containing both at least one halogen and at least one hydroxyl group which may be regarded as being derived from a di- or polyhydroxy alcohol by a partial exchange of the hydroxyl groups for chlorine, bromine or iodine (or from a mono- or polyhydroxy alcohol by the substitution of one or more hydrogen atoms in the alcohol radical) and the derivatives (such as esters), or internal anhydrides (such as epichlorohydrin) of such halohydrins, or substances or mixtures of substances which are capable of yielding such halohydrins.

The term "hydroxy-alkyl" is intended to include the halogenated or non-halogenated radicals of di- or polyvalent alcohols in conjunction with one or more oxygens or hydroxyls.

Wherever the context permits, the terms "alkyl" "alkylate", "alkylating agents", "alkylation" are intended to include unsubstituted or substituted (for example aralkyl groups) alkyl groups, alkylate with alkylating agents that contain unsubstituted or substituted (for example aralkyl groups) alkyl groups, alkylating agents that contain unsubstituted or substituted (for example aralkyl groups) alkyl groups, alkylation with alkylating agents that contain unsubstituted or substituted (for example aralkyl groups) alkyl groups.

The term "hydroxy-alkylating agents" is intended to include halogen derivatives of di-or polyhydric alcohol, particularly halohydrins, such as mono-halohydrins and alkylene oxides.

In the specification and claims the expression "halogen fatty acid" or "monohalogen fatty acid" includes, wherever the context permits, monochlor-, monobrom- and monoiodo-fatty acids themselves, their derivatives (such as esters) and their salts, as well as substances and mixtures of substances which yield monohalogen fatty acids or their derivatives.

The expression "artificial structures" or "shaped structures" used in the specification and claims is intended to include: Artificial threads, particularly artificial silk and staple fibre, artificial hair, artificial straw; film of every kind; bands and plates of every kind; plastic masses of any description; adhesives and cements; finishes, coatings and layers of every kind, particularly such as are applicable in finishing, filling and dressing of textile fabrics; thickening agents or fixing agents for pigments in textile printing and the like; sizing of yarn; paper-like surfacing, paper-sizing; in the manufacture of artificial leather or of book-cloth and tracing cloth or of transparent paper or of transparent cloth and the like.

The term "artificial threads" denotes artificial threads and spun goods of all kinds, for instance artificial silk, artificial cotton, artificial wool, artificial hair and artificial straw of any kind.

In the appended claims, it is not intended that the terms "cellulose compounds" or "cellulose ethers" shall be read as including aryl ethers of cellulose (if in fact any aryl ethers of cellulose exist). In other words, I do not claim herein, the employment of any aryl ethers of cellulose.

The novel alkyl ethers of cellulose described herein, having the solubilities stated and the process of making same as described herein, are not claimed herein, but are claimed in a copending application Serial No. 314,359, filed January 17, 1940.

Xanthates of alkali soluble alkyl ethers of cellulose and of alkali soluble hydroxy acid ethers of cellulose, are not broadly claimed herein but are claimed in a copending application Serial No. 365,392, filed November 12, 1940 (now U. S. Patent 2,265,914).

The production of shaped artificial structures by the coagulation of solutions of the xanthates mentioned in the last paragraph, is not claimed herein, but is claimed in a copending application Serial No. 353,420, filed August 20, 1940 (now U. S. Patent 2,265,915).

What I claim is:

1. A process for the manufacture of xanthates of cellulose compounds, which process comprises treating in the presence of an alkali, a cellulose compound, in which at least one hydroxyl hydrogen atom of the cellulose molecule $n(C_6H_{10}O_5)$ is substituted by an organic radical and which contains at least one free hydroxyl group capable of binding $CS_2$, said cellulose compound being one that is, in part at least, soluble in the cold in aqueous caustic alkali solution, and which cellulose compound is insoluble in water, with carbon bisulphide in an amount not below 3% but less than 20%, calculated on the weight of the cellulose compound.

2. A process for the manufacture of xanthates of cellulose compounds, which process comprises treating in the presence of an alkali, a water-insoluble cellulose ether which is, in part at least, soluble in aqueous caustic alkali solution in the cold, and in which at least one hydroxyl hydrogen atom of the cellulose molecule $n(C_6H_{10}O_5)$ is substituted by an organic radical and which contains at least one free hydroxyl group capable of binding $CS_2$, with an amount of $CS_2$ which is not below 3% but less than 10%, based on the weight of the cellulose ether.

3. A process for the manufacture of xanthates of cellulose compounds, which process comprises treating in the presence of an alkali, a water-insoluble cellulose compound soluble in aqueous caustic alkali solution, in which at least one hydroxyl hydrogen atom of the cellulose molecule $n(C_6H_{10}O_5)$ is substituted by an organic radical and which contains at least one free hydroxyl group capable of binding $CS_2$, with an amount of $CS_2$ that is not below 3% but less than 7%, calculated on the weight of the cellulose compound.

4. A process for the manufacture of xanthates of cellulose compounds, which process comprises treating in the presence of an alkali, a cellulose ether which contains per one alcohol radical, introduced ether-fashion into the cellulose molecule, substantially more than one $C_6H_{10}O_5$-molecular unit of cellulose, said ether being insoluble in water and containing at least one free hydroxyl group capable of binding $CS_2$, with carbon bisulphide in amount not below 3% but less than 20 per cent. thereof, calculated on the weight of the cellulose ether.

5. A process for the manufacture of xanthates of cellulose compounds, which process comprises treating in the presence of an alkali, a cellulose ether which contains per one alcohol radical, introduced ether-fashion into the cellulose molecule, substantially more than one $C_6H_{10}O_5$-molecular unit of cellulose, said ether being insoluble in water and containing at least one free hydroxyl group capable of binding $CS_2$, with carbon bisulphide in amount not below 3% but less than 10 per cent. calculated on the weight of the cellulose ether.

6. A process for the manufacture of xanthates of cellulose compounds, which process comprises treating in the presence of an alkali, a cellulose ether containing at least one free hydroxyl group capable of binding $CS_2$, and which cellulose ether is, at least in part, soluble in aqueous caustic alkali solution in the cold, with carbon bisulphide in amount not below 3% but less than 7 per cent. calculated on the weight of the cellulose ether.

7. A process for the manufacture of a xanthate of a cellulose compound, which process comprises treating, in the presence of an alkali, a cellulose ether which contains per one alcohol radical, introduced ether-fashion into the cellulose molecule, substantially more than one $C_6H_{10}O_5$-molecular unit of cellulose, said ether being insoluble in water and containing at least one free hydroxyl group capable of binding $CS_2$, with carbon bisulphide in amount not less than 3% but less than 20% thereof, calculated on the weight of the cellulose ether, wherein the cellulose ether is an ether selected from the group consisting of alkyl ethers, aralkyl ethers, hydroxy-alkyl ethers, hydroxy-acid ethers, alkyl-hydroxy-alkyl ethers, alkyl-hydroxy-acid ethers and hydroxy-alkyl-hydroxy-acid ethers of cellulose.

8. A process as claimed in claim 4, wherein the cellulose ether contains not more than one alcohol radical per $2C_6H_{10}O_5$ molecular units of cellulose.

9. A process as claimed in claim 4, wherein the cellulose ether contains not more than one alcohol radical per $4C_6H_{10}O_5$-molecular units of cellulose.

10. A process of making shaped structures, wherein a solution of a cellulose compound xanthate prepared by treating a cellulose compound in which at least one hydroxyl hydrogen atom of the cellulose molecule $n(C_6H_{10}O_5)$ is substituted by an organic radical and which contains at least one free hydroxyl group capable of binding $CS_2$, said cellulose compound being one that is, in part at least, soluble in the cold in aqueous caustic alkali solution, and which cellulose compound is insoluble in water, with carbon bisulphide in an amount not below 3% but less than 20%, calculated on the weight of the cellulose compound, is brought into an appropriate shape or form and acted upon with a coagulating agent.

11. A xanthate of a cellulose compound in which at least one hydroxyl hydrogen atom of the cellulose molecule $n(C_6H_{10}O_5)$ is substituted by an organic radical which xanthate in the fresh state contains less than one CSS-group per 2 $C_6H_{10}O_5$-molecular units of cellulosic body, which product is substantially identical with a product prepared by treating a cellulose compound in which at least one hydroxyl hydrogen atom of the cellulose molecule $n(C_6H_{10}O_5)$ is substituted by an organic radical and which contains at least one free hydroxyl group capable of binding $CS_2$, said cellulose compound being one that is, in part at least, soluble in the cold in aqueous caustic alkali solution, and which cellulose compound is insoluble in water, with carbon bisulphide in amount not below 3% but less than 20%, calculated on the weight of the cellulose compound.

12. A process of making a shaped structure wherein a shaped solution of a xanthate of a cellulose compound prepared according to the process claimed in claim 1, is acted upon with at least one agent which has a coagulating effect on the shaped material, and plasticizing the freshly coagulated material.

LEON LILIENFELD.